(12) United States Patent
O'Hare et al.

(10) Patent No.: US 10,346,064 B1
(45) Date of Patent: Jul. 9, 2019

(54) MANAGING COMPRESSION BASED ON A COMPRESSION PROFILE OF HOST DATA INITIALLY RESIDING ON A SOURCE STORAGE ARRAY

(71) Applicant: EMC IP Holding Company LLC, Hopkinton, MA (US)

(72) Inventors: Jeremy J. O'Hare, Westborough, MA (US); Guy Rososhansky, Worcester, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 175 days.

(21) Appl. No.: 15/395,133

(22) Filed: Dec. 30, 2016

(51) Int. Cl.
*G06F 3/06* (2006.01)

(52) U.S. Cl.
CPC .......... *G06F 3/0619* (2013.01); *G06F 3/0608* (2013.01); *G06F 3/0665* (2013.01); *G06F 3/0689* (2013.01); *G06F 2212/401* (2013.01)

(58) Field of Classification Search
CPC ....... G06F 3/0646–0647; G06F 3/0608; G06F 2212/1044; G06F 2212/401; G06F 17/30153; G06F 16/1744
See application file for complete search history.

(56) References Cited

U.S. PATENT DOCUMENTS

| | | | |
|---|---|---|---|
| 7,395,283 B1 | 7/2008 | Atzmony et al. | |
| 8,478,731 B1 | 7/2013 | Throop et al. | |
| 9,575,851 B1 | 2/2017 | Natanzon et al. | |
| 9,619,264 B1 | 4/2017 | Natanzon et al. | |
| 9,639,383 B1 | 5/2017 | Natanzon et al. | |
| 9,658,929 B1 | 5/2017 | Natanzon et al. | |
| 9,659,074 B1 | 5/2017 | Natanzon et al. | |
| 2006/0212625 A1* | 9/2006 | Nakagawa | G06F 3/0608 710/68 |
| 2008/0172525 A1* | 7/2008 | Nakamura | G06F 3/0608 711/113 |
| 2012/0131293 A1* | 5/2012 | Benhase | G06F 3/065 711/162 |
| 2014/0229675 A1* | 8/2014 | Aizman | G06F 3/0608 711/117 |
| 2016/0350021 A1* | 12/2016 | Matsushita | G06F 12/0873 |
| 2017/0103356 A1* | 4/2017 | Sabloniere | G06Q 10/06315 |

* cited by examiner

*Primary Examiner* — Edward J Dudek, Jr.
*Assistant Examiner* — Andrew Russell
(74) *Attorney, Agent, or Firm* — BainwoodHuang

(57) ABSTRACT

A technique manages compression based on host data initially residing on a source storage array. The technique involves providing, based on source segments of the host data while the host data initially resides on the source storage array, compressibility labels (or tags) that label the source segments of the host data. Each compressibility label indicates a projected compression level for a respective source segment of the host data. The technique further involves generating a compression profile based on the compressibility labels that label the source segments of the host data. The technique further involves providing, based on the compression profile, a compression tier configuration that defines a prearrangement of compression tiers on a target storage array that receives the host data from the source storage array, the prearrangement of compression tiers providing storage units of allocation having different predefined sizes.

20 Claims, 5 Drawing Sheets

MANAGING COMPRESSION BASED ON A COMPRESSION PROFILE OF HOST DATA INITIALLY RESIDING ON A SOURCE STORAGE ARRAY

BACKGROUND

Conventional data storage systems maintain host data on behalf of one or more host computers. If possible, these conventional data storage systems may compress the host data prior to storing the host data on physical storage. For example, a conventional data storage system may be able to compress some host data by a ratio of 2-to-1 and other host data by a ratio of 4-to-1.

Some conventional data storage systems store host data compressed at different compression ratios side by side in an intermixed manner. Other conventional data storage systems store host data compressed at different ratios in different storage areas, e.g., host data compressed at a ratio of 2-to-1 in one storage area and host data compressed at a ratio of 4-to-1 in another storage area.

SUMMARY

There are deficiencies to the above-described conventional data storage systems. For example, the above-described conventional data storage systems that store host data of different compression ratios side by side in an intermixed manner may suffer from fragmentation and alignment issues resulting in extra operations as the host data is modified and changes in size over time.

Additionally, the above-described conventional data storage systems that store host data compressed at different ratios in different storage areas may not be optimized for the host data and thus require real-time reconfiguration. For example, suppose that a customer specifies to a data storage system manufacturer that, on average, the customer's host data compresses at a ratio of 4-to-1. In response to this specification, the manufacturer may ship a new data storage system to the customer with a large storage area aligned for 4-to-1 compression (e.g., if the initial host data size is 128 KB, the new data storage system may be configured to store the host data mainly in units of 32 KB). However, if the customer's host data was mostly a mixture of some host data that compresses at a ratio of 2-to-1 (e.g., from 128 KB down to 64 KB) and other host data that compresses at a ratio of 8-to-1 (e.g., from 128 KB down to 16 KB) with very little data that actually compresses at a ratio of 4-to-1, the new data storage system is not properly optimized to store the customer's host data. Rather, the new data storage system may need to perform significant real-time reconfiguration once the new data storage system is deployed at the customer's location (e.g., reconfiguration of the 32 KB storage area into a 64 KB storage area and a 16 KB storage area). Unfortunately, such reconfiguration may significantly reduce system performance, e.g., require special operations that compete with host input/output (I/O) requests and consume data storage resources that could otherwise be spent doing other work. Moreover, the customer may be disappointed if the customer sees the host data initially stored at a compression ratio that is lower than the customer's specified average compression ratio (e.g., stored at a compression ratio of 2-to-1 rather than the customer's average compression ratio of 4-to-1).

In contrast to the above-described conventional data storage systems, improved techniques are directed to managing compression based on a compression profile of host data initially residing on a source storage array. Along these lines, source segments of the host data may be tagged or labeled with projected compression levels while the host data resides on the source storage array. A compression profile (or fingerprint) which is based on the tags is then used to determine a prearrangement of compression tiers on a target storage array that later receives the host data from the source storage array. Such operation enables the target storage array to be customized with compression tiers that are better suited to holding compressed host data when the host data is migrated to the target storage array from the source storage array. Moreover, the operator of the target storage array has improved awareness of how the host data from the source storage array will be compressed (e.g., an understanding that some host data is only compressible to a lower compression ratio even though the average compression ratio may be higher).

One embodiment is directed to a method of managing compression based on host data initially residing on a source storage array. The method includes providing, based on source segments of the host data while the host data initially resides on the source storage array, compressibility labels (or tags) that label the source segments of the host data. Each compressibility label indicates a projected compression level for a respective source segment of the host data. The method further includes generating a compression profile based on the compressibility labels that label the source segments of the host data. The method further includes providing, based on the compression profile, a compression tier configuration that defines a prearrangement of compression tiers on a target storage array that receives the host data from the source storage array, the prearrangement of compression tiers providing storage units of allocation having different predefined sizes.

In some arrangements, providing the compressibility labels that label the source segments of the host data includes reading, as the source segments of the host data from the source storage array, tracks of the host data from storage of the source storage array and performing projected compression operations on the tracks to provide the compressibility labels. The tracks may have a uniform size (e.g., 128 KB).

In some arrangements, reading the tracks of the host data from the storage of the source storage array includes reading all of the host data that is stored on the source storage array. In other arrangements, reading the tracks of the host data from the storage of the source storage array includes reading, as a representative sample of the host data, less than all of the host data that is stored on the source storage array.

In some arrangements, performing the projected compression operations on the tracks to provide the compressibility labels includes, for each track, performing a respective projected compression operation that uses that track as input and provides a projected compression result as output. The projected compression result includes a respective compressibility label that identifies one of the different predefined sizes as a projected compression level for that track.

In some arrangements, generating the compression profile includes providing tallies of the different predefined sizes based on the compressibility labels that label the source segments of the host data. Providing the tallies of the different predefined sizes may include incrementing a plurality of counters based on the compressibility labels that label the source segments of the host data, each counter of the plurality of counters representing one of the different predefined sizes.

In some arrangements, providing the tallies of the different predefined sizes further includes outputting, as at least a portion of the compression profile, a plurality of counter values from the plurality of counters. The plurality of counter values identifies a distribution of the different predefined sizes.

In some arrangements, providing the compression tier configuration that defines the prearrangement of compression tiers on the target storage array includes allocating, based on the distribution of the different predefined sizes, storage of the target storage array into different compression tiers of the prearrangement of compression tiers. Along these lines, allocating the storage of the target storage array to the different compression tiers may include mimicking the distribution of the different predefined sizes in an allocated distribution of physical storage of the target storage array.

In some arrangements, allocating the storage of the target storage array into the different compression tiers includes creating a first compression tier and a second compression tier from physical non-volatile memory of the target storage array. The first compression tier has storage units of allocation of a first size, and the second compression tier has storage units of allocation of a second size which is different from the first size.

In some arrangements, the storage of the target storage array includes pool of storage devices. In these arrangements, each storage device of the pool includes storage units of allocation of the first compression tier and storage units of allocation of the second compression tier.

In some arrangements, the method further includes migrating the host data initially residing on the source storage array from the source storage array to the target storage array. Migrating the host data includes reading the source segments of the host data from the source storage array, processing the source segments read from the source storage array into target portions of the host data (e.g., portions of compressed data), and writing the target portions of the host data into the physical non-volatile memory of the target storage array.

In some arrangements, writing the target portions of the host data into the physical non-volatile memory of the target storage array includes storing at least some target portions in storage units of allocation of the first compression tier, and storing at least some target portions in storage units of allocation of the second compression tier.

In some arrangements, each different predefined size of the different predefined sizes of the storage units of allocation is less than or equal to the uniform size. The different predefined sizes may include a smallest predefined size, and each predefined size of the different predefined sizes may be a multiple of the smallest predefined size.

In some arrangements, the smallest predefined size is 8 KB, and each predefined size of the different predefined sizes is a multiple of 8 KB. In some arrangements, the uniform size of the tracks of the host data that are read from storage of the source storage array is 128 KB.

Another embodiment is directed to an electronic apparatus which includes memory, and control circuitry coupled to the memory. The memory stores instructions which, when carried out by the control circuitry, cause the control circuitry to:
  (A) based on source segments of host data while the host data initially resides on a source storage array, provide compressibility labels that label the source segments of the host data, each compressibility label indicating a projected compression level for a respective source segment of the host data;
  (B) generate a compression profile based on the compressibility labels that label the source segments of the host data; and
  (C) based on the compression profile, provide a compression tier configuration that defines a prearrangement of compression tiers on a target storage array that receives the host data from the source storage array, the prearrangement of compression tiers providing storage units of allocation having different predefined sizes.

Yet another embodiment is directed to a computer program product having at least one non-transitory computer readable medium, the at least one non-transitory computer readable medium having stored thereon a set of instructions to manage compression based on host data initially residing on a source storage array. The set of instructions, when carried out by control circuitry, causes the control circuitry to perform a method of:
  (A) based on source segments of the host data while the host data initially resides on the source storage array, providing compressibility labels that label the source segments of the host data, each compressibility label indicating a projected compression level for a respective source segment of the host data;
  (B) generating a compression profile based on the compressibility labels that label the source segments of the host data; and
  (C) based on the compression profile, providing a compression tier configuration that defines a prearrangement of compression tiers on a target storage array that receives the host data from the source storage array, the prearrangement of compression tiers providing storage units of allocation having different predefined sizes.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in managing compression based on host data initially residing on a source storage array.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to managing compression based on a compression profile (or fingerprint) of host data initially residing on a source storage array. Along these lines, source segments of the host data may be labeled (or tagged) with projected compression levels which are then used to determine a prearrangement of compression tiers on a target storage array that receives the host data from the source storage array. Such labeling forms at least a portion of a compression profile which enables the target storage array to be customized with compression tiers that are better suited to holding compressed host data when the host data is transferred from the source storage array to the target storage array. Moreover, the operator of the target storage array has improved awareness of how the host data from the source storage array will be compressed.

Figure 1:
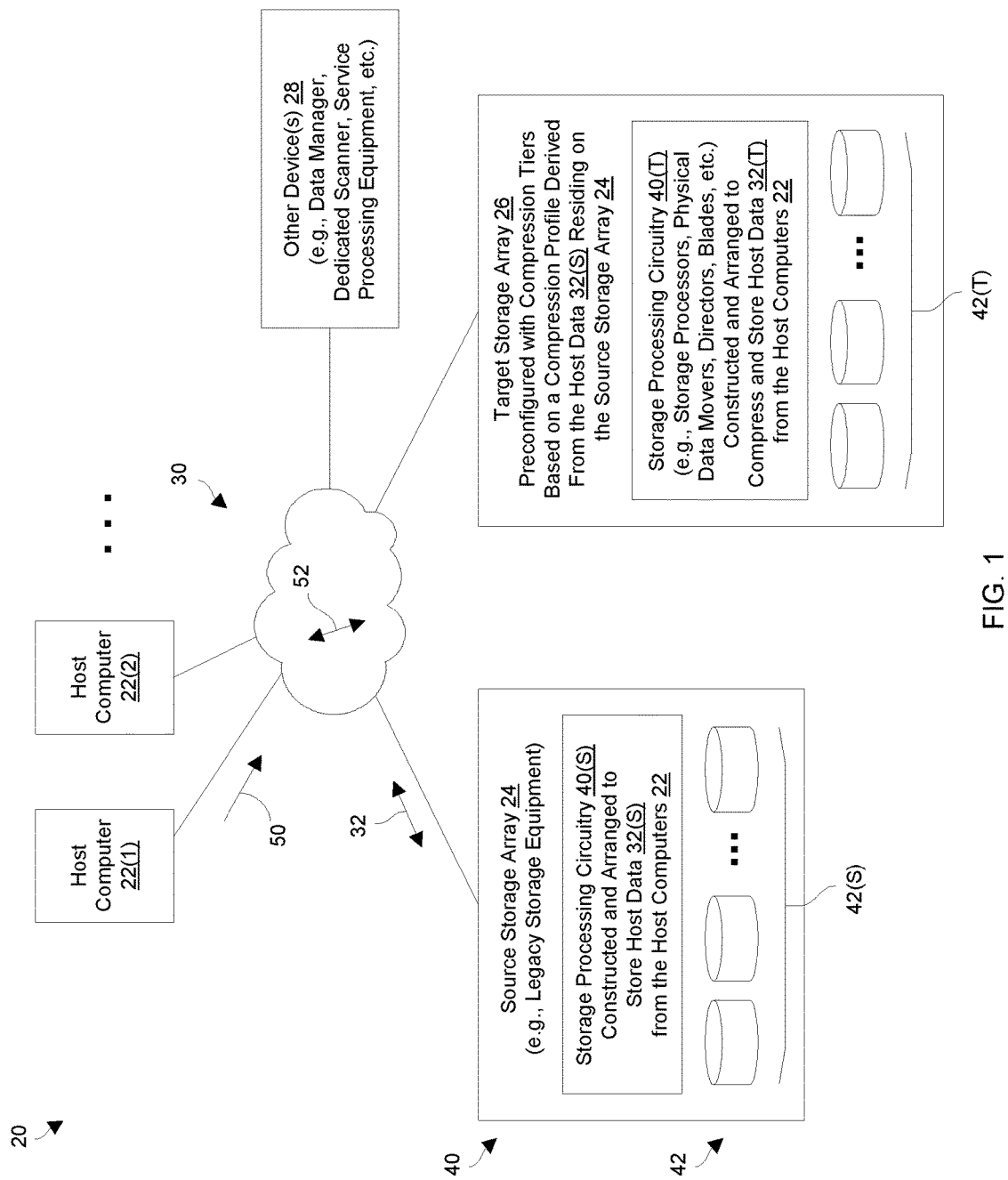
FIG. 1 is a block diagram of a data storage environment manages compression based on a compression profile of host data initially residing on a source storage array.

FIG. 1 shows a data storage environment 20 which manages compression based on a compression profile derived from host data initially residing on a source storage array. The data storage environment 20 includes host computers 22(1), 22(2), . . . (collectively, host computers 22), a source storage array 24 (or simply source array 24), a target storage array 26 (or simply target array 26), one or more other devices 28, and communications medium 30.

Each host computer 22 is constructed and arranged to access host data 32 that is maintained by the data storage environment 20. Along these lines, the host computers 22 may operate as independent devices, as one or more clusters, or combinations thereof to perform useful work (e.g., to operate as front-ends to databases, as webservers, as content servers, as email servers, combinations thereof, etc.).

Each storage array 24, 26 is constructed and arranged to store and retrieve at least some of the host data 32 on behalf of the host computers 22. The host data 32 may reside in files of file systems, as block-based data within logical units of storage (LUNs) or volumes, volumes within files, file systems within volumes, combinations thereof, and so on. The particular storage techniques that are put in use (e.g., file-based, block-based, etc.) may be application dependent and can be configured by a human operator (or administrator) of the data storage environment 20.

As will be explained shortly, the source array 24 (e.g., legacy equipment) may initially store host data 32(S) and the target array 26 may not be present in the data storage environment 20. At some point, the operator of the source array 24 may decide to replace the source array 24 with the target array 24 (e.g., new equipment intended to replace the legacy equipment). Prior to deployment of the target array 24 within the data storage environment 20, the operator may operate a specialized tool that scans the host data 32(S) to generate a compression profile so that the target array 24 may be preconfigured, based on the compression profile, with customized tiers to accommodate the host data 32 which is then written as target host data 32(T) to the target array 26. Each storage array 24, 26 includes respective storage processing circuitry 40 and respective storage devices 42. The storage processing circuitry 40 (e.g., physical storage processors, physical data movers, directors, blades, etc.) responds to host input/output (I/O) requests 50 by writing host data 32 to and reading host data 32 from the storage devices 42. The storage devices 42 (e.g., flash memory devices, magnetic disk drives, etc.) stores the host data 32 in a non-volatile and fault tolerant manner (e.g., in disk pools running RAID1, RAID5, RAID6, etc.). As shown in FIG. 1, the source array 24 includes storage processing circuitry 40(S) and storage devices 42(S). Likewise, the target array 26 includes storage processing circuitry 40(T) and storage devices 42(T).

The other device(s) 28 represent equipment that is external to the host computers 22 and the storage arrays 24, 26. Such equipment may include a data manager device, dedicate scanning circuitry, a service processor, and so on.

The communications medium (or fabric) 30 is constructed and arranged to connect the various components of the data storage environment 20 together to enable these components to exchange electronic signals 52 (e.g., see the double arrow 52). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting SAN-based communications, LAN-based communications, cellular communications, WAN-based communications, distributed infrastructure communications, other topologies, combinations thereof, etc.

During initial operation, the host computers 22 store and retrieve host data 32 on the source array 24 (e.g. see the source host data 32(S)) and the target array 26 is not yet deployed in the data storage environment 20. While the host data 32(S) resides on the storage devices 42(S), the source host data 32(S) may or may not be compressed.

At some point, a decision may be made to replace the source array 24 with new data storage equipment (e.g., to upgrade the source array 24 to new equipment which is faster and has more capacity, etc.). In order to more accurately understand how best to preconfigure the new data storage equipment, a user may operate specialized circuitry to perform a specialized process that generates a compression profile (or fingerprint) and provides a compression tier arrangement for the target array 26 based on the compression profile.

To this end, the specialized circuitry examines segments (or tracks) of the host data 32(S) residing on the source array 24 and tags each examined segment with a label identifying a level of compressibility for that segment. The specialized circuitry then generates, based on the tags, a compression profile that describes compressibility aspects of the host data 32 such as how much of the host data 32 is compressible to a 2-to-1 ratio, to a 4-to-1 ratio, to an 8-to-1 ratio, and so on.

Before the target array 26 is deployed (e.g., as the target array 26 is being assembled and tested by the manufacturer and prior to shipping the target array 26 to the customer), the target array 26 receives an initial configuration of compression tiers that is based on the compression profile. In particular, each compression tier is constructed and arranged to provide storage units of allocation in a particular uniform size (e.g., 8 KB, 16 KB, 24 KB, 32 KB, 40 KB, etc.) to hold data compressed to a certain ratio. The initial configuration specifies a capacity for each compression tier so that compression tier capacity is smartly pre-apportioned to later receive compressed host data 32(T) when the target array 26 replaces the source array 24.

Accordingly, once target array 26 is deployed and the process of writing host data 32 onto the target array 26 has begun, the need to reconfigure the compression tiers in real-time is reduced. Moreover, prior to deployment, the operator will already have a detailed understanding of how the host data 32 compresses rather than simply know an average compression ratio as in conventional approaches. Thus, as the host data 32 is written to the target array 26 and stored as the host data 32(T), the user will understand that the host data 32 will provide compression as expected even if initial host data 32(T) compresses at a ratio that is lower than the expected average compression ratio. Further details will now be provided with reference to FIG. 2.

Figure 2:
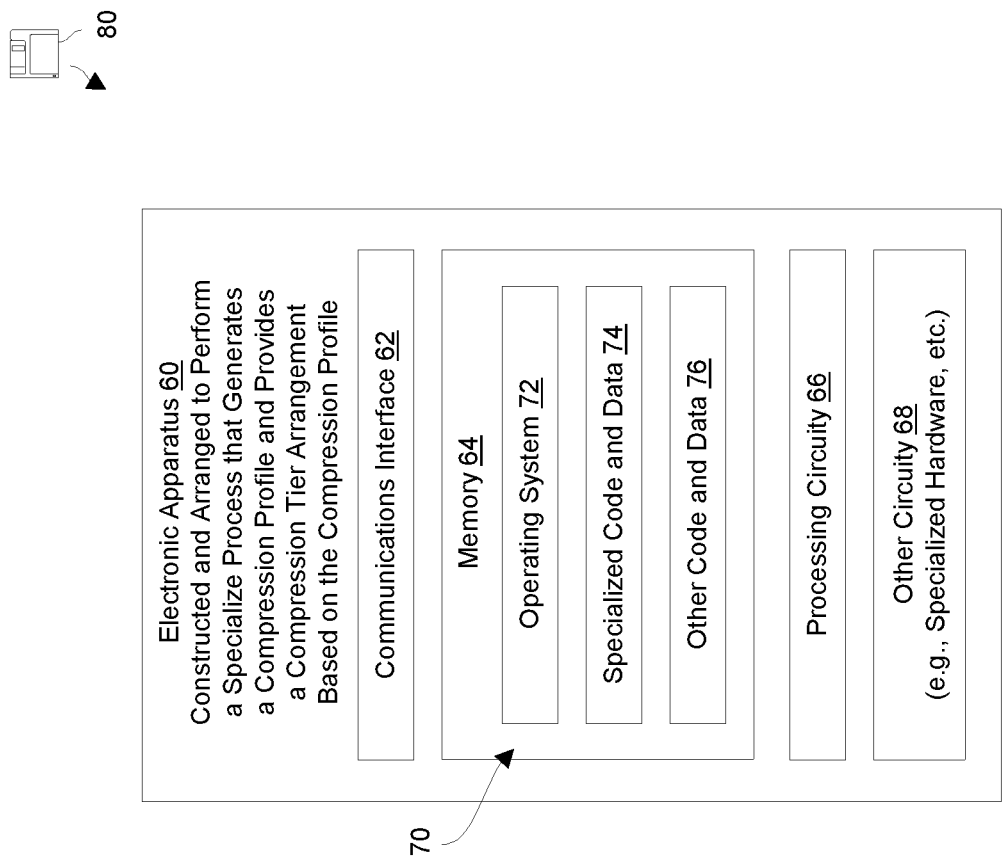
FIG. 2 is a block diagram of an electronic apparatus of the environment of FIG. 1.

FIG. 2 shows an electronic apparatus 60 which is suitable for the above-mentioned specialized circuitry. The electronic apparatus 60 may be formed by part of a host computer 22, by one of the other devices 28, by part of the source storage array 24, by combinations thereof, and so on. As shown in FIG. 2, the electronic apparatus 60 includes a communications interface 62, memory 64, processing circuitry 66, and perhaps other circuitry 68.

The communications interface 62 is constructed and arranged to connect the electronic apparatus 60 to the communications medium 26 (also see FIG. 1) to enable electronic communications with other components of the data storage environment 20. Such communications may be SAN-based, IP-based, cellular-based, cable-based, fiber-optic-based, wireless, cloud-based, combinations thereof, and so on. Accordingly, the communications interface 62 enables the electronic apparatus 60 to robustly and reliably communicate with other devices.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized code and data 74, and perhaps other applications and data 76. The operating system 72 includes code such as a kernel to manage computerized resources (e.g., processor cycles, memory space, etc.), drivers, and so on. The specialized code and data 74 enables performance of the earlier-mentioned specialized process. The other applications and data 76 provides other features and may depend on other uses of the electronic apparatus 60 (e.g., a host computer 22 operating as a database server, a webserver, an email server, etc.).

The processing circuitry 66 is constructed and arranged to operate in accordance with the various software constructs 70 stored in the memory 64. Along these lines, the processing circuitry 66 operates in accordance with the specialized code and data 74 to form the specialized circuitry that performs the earlier-mentioned specialized process. Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic apparatus 60. In particular, the computer program product 80 has a non-transitory (or non-volatile) computer readable medium which stores a set of instructions which controls one or more operations of the electronic apparatus 60. Examples of suitable computer readable storage media include tangible articles of manufacture and apparatus which store instructions in a non-volatile manner such as flash memory, DVD, CD-ROM, disk memory, tape memory, and the like.

The other circuitry 68 represents optional specialize hardware of the electronic apparatus 60. Along these lines, the electronic apparatus 60 may be a host computer 22 (FIG. 1) that is equipped with specialized hardware to perform certain specialized operations. Further details will now be provided with reference to FIGS. 3 and 4.

Figure 3:
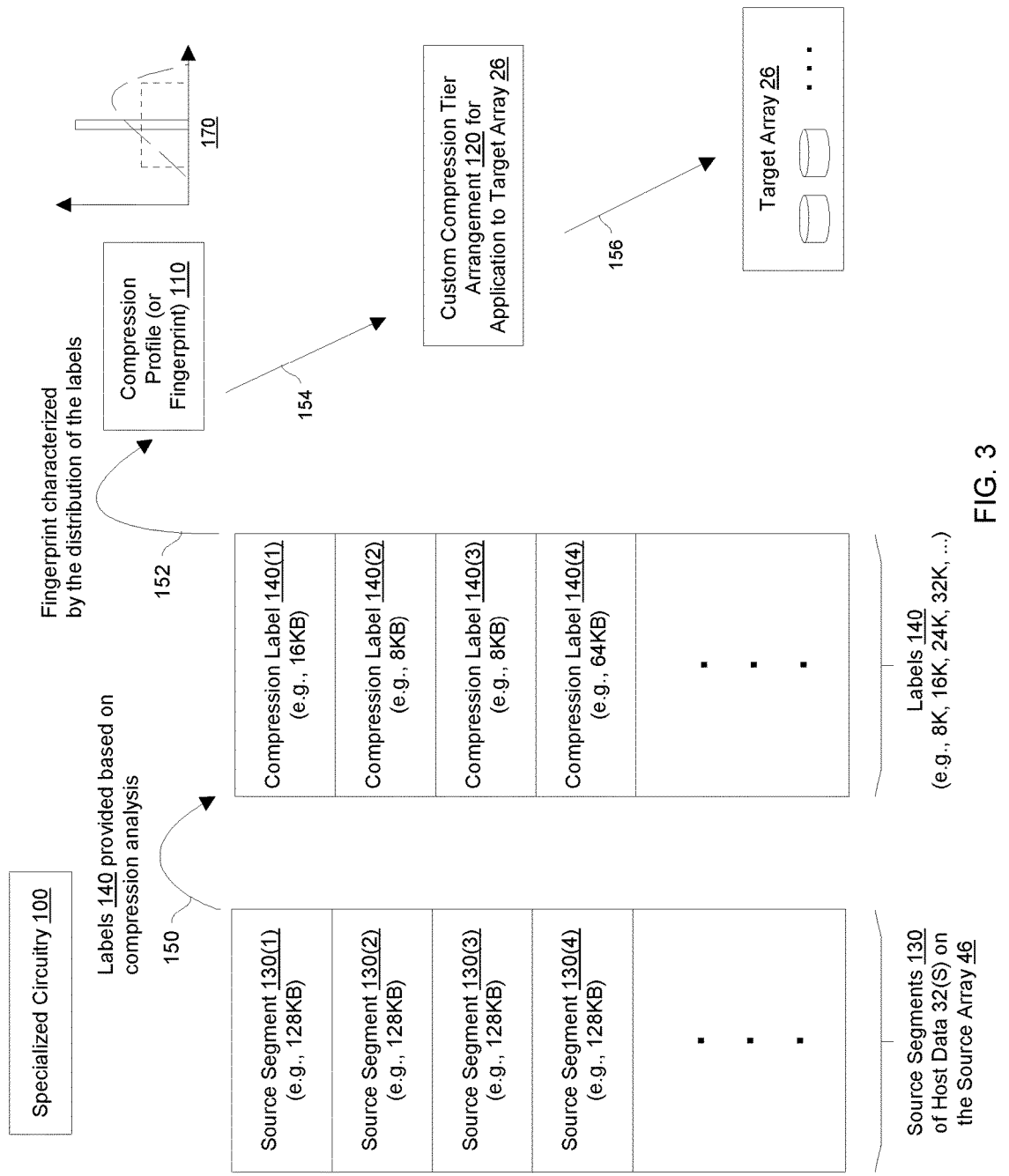
FIG. 3 is a block diagram illustrating particular details of various operations of the electronic apparatus of FIG. 2.
Figure 4:
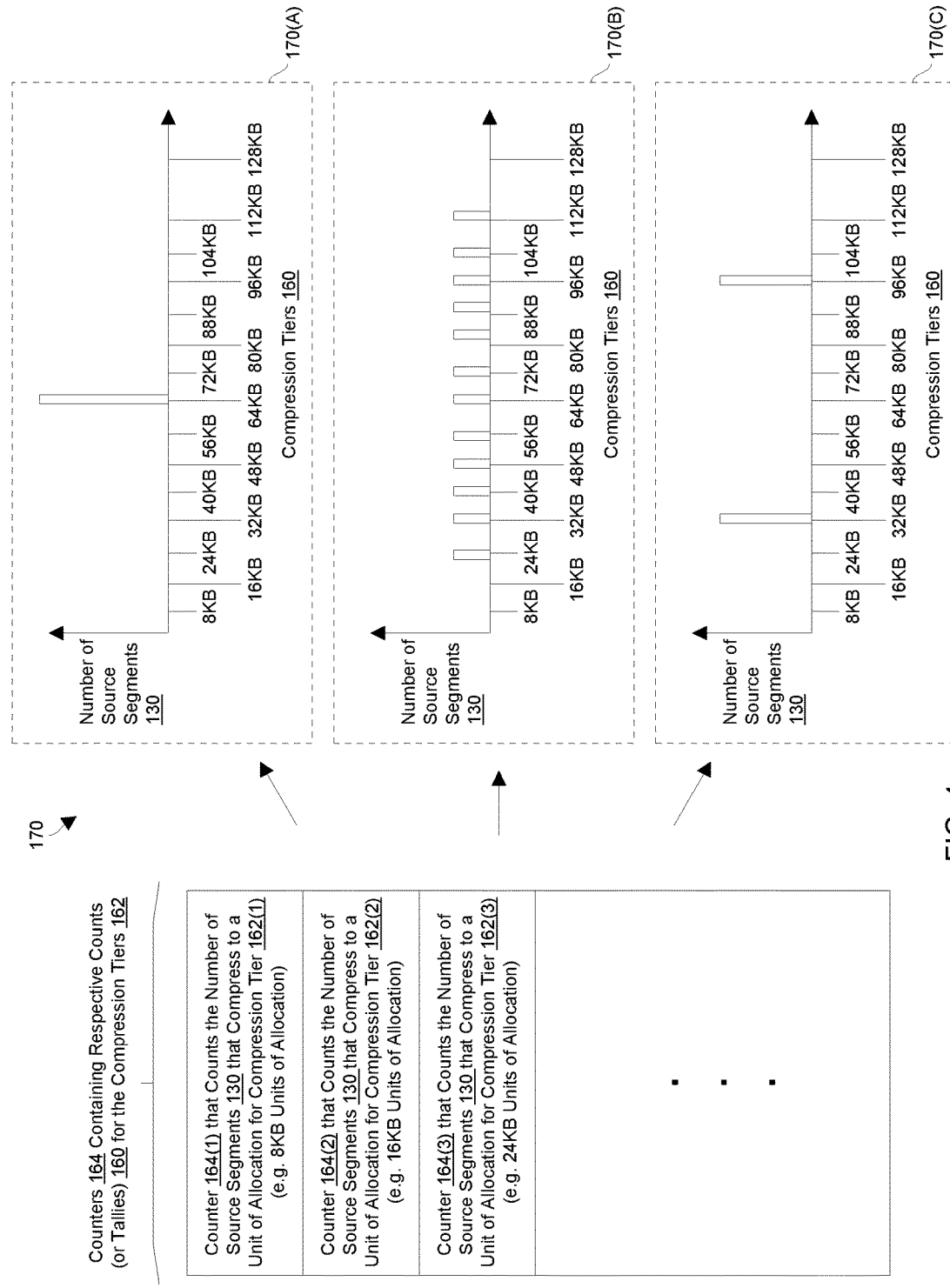
FIG. 4 is a block diagram illustrating particular details of a compression profile which is generated by the electronic apparatus of FIG. 2.

FIG. 3 shows particular details of how specialized circuitry 100 generates a compression profile (or fingerprint) 110 from the host data 32(S) residing on the storage array 24, and provides a compression tier arrangement 120 for a target array 26 based on the compression profile 110 (also see FIG. 1). FIG. 4 shows particular details of the compression profile 110. As mentioned earlier, the specialized circuitry 100 may be formed by a host computer 22, the source storage array 24, another device 28, combinations thereof, and so on operating in accordance with specialized instructions (also see the specialized code and data 74 in FIG. 2). It should be understood that the specialized circuitry 100 may operate while the storage array 24 performs data storage operations in real-time on behalf of one or more host computers 22.

First, as shown in FIG. 3, the specialized circuitry 100 reads the host data 32(S) from the storage devices 42(S) in uniformly-sized portions, i.e., source segments or tracks 130(1), 130(2), 130(3), 130(4), . . . (collectively, source segments 130 of host data). In some arrangements, the source segments 130 are 128 KB in size, although other sizes are suitable for use as well such as 8 KB, 16 KB, 32 KB, 64 Kb, etc.

For each source segment 100 of host data 32(S), the specialized circuitry 100 performs a compression analysis operation that determines whether that source segment 130 is compressible. If so, the specialized circuitry 100 labels that source segment 100 with a respective label 140 identifying a level of compression for that source segment 130.

By way of example, the specialized circuitry 100 determines that the source segment 130(1) compresses to a first compression level and provides a compression label 140(1) that identifies the first compression level (e.g., 128 KB to 16 KB). Additionally, the specialized circuitry 100 determines that each of the source segments 130(2), 130(3) compresses to a second compression level and provides compression labels 140(2), 140(3) that identify the second compression level (e.g., 128 KB to 8 KB). Furthermore, the specialized circuitry 100 determines that the source segment 130(4) compresses to another compression level and provides a compression label 140(4) that identifies that compression level (e.g., 128 KB to 64 KB), and so on.

In some arrangements, the specialized circuitry 100 evaluates every source segment 130 that the specialized circuitry 100 is able to read from the source array 24 (e.g., all of the host data 32(S)). In other arrangements, the specialized circuitry 100 evaluates less than every source segment 130 that the specialized circuitry 100 is able to read from the source array 24 (e.g., a set of representative host data 32(S), a smart sampling of the host data 32(S), etc.).

A result of this labeling activity (arrow 150) is a set of compressibility labels 140 that label the source segments 130 of the host data 32(S). Each compressibility label (or tag) indicates a projected compression level for a respective source segment 130 of the host data 32(S).

Once the set of compressibility labels 140 is provided, the specialized circuitry 100 generates the compression profile 110 based on the set of compressibility labels 110 (arrow 152). In particular, the specialized circuitry 100 tabulates a tally 160 for the size of each storage unit of allocation that is provided by the various compression tiers 162 supported by the target array 26.

As shown in FIG. 4, to provide the tallies 160, and the specialized circuitry 100 associates a respective counter 164 to each compression tier 162 supported by the target array 26. Along these lines, the counter 164(1) holds a count of the number of source segments 130 that are compressible to an 8 KB unit of allocation, the counter 164(2) holds a count of the number of source segments 130 that are compressible to an 16 KB unit of allocation, the counter 164(3) holds a count of the number of source segments 130 that are compressible to an 24 KB unit of allocation, and so on.

When generating the counts 160, the specialized circuitry 100 initializes the value in each counter 164 to zero. Then, for each compressibility label 140 that was provided by the compression analysis operations, the specialized circuitry 100 increments the appropriate counter 164.

For example, suppose that the counter 164(1) holds, as contents, the number of source segments 130 that compress to 8 KB. Similarly, suppose that the counter 164(2) holds the number of source segments 130 that compress to 16 KB, the counter 164(3) holds the number of source segments 130 that compress to 24 KB, and so on. Accordingly, because the first compression label 140(1) indicates that the source segment 130(1) is compressible to 16 KB (also see FIG. 3), the specialized circuitry 100 increments the counter 164(3). Likewise, because the compression labels 140(2) and 140(3) indicate that each of the source segments 130(2) and 130(3) is compressible to 8 KB, the specialized circuitry 100 increments the counter 164(2) twice. Furthermore, because the compression label 140(4) indicates that the source segment 130(4) is compressible to 64 KB (also see FIG. 3), the specialized circuitry 100 increments a corresponding counter 164, and so on.

Example sizes for the storage units of allocation for the various compression tiers 162 include 8 KB, 16 KB, 24 KB, 32 KB, 40 KB, 48 KB, 56 KB, 64 KB, 72 KB, 80 KB, 88 KB, 96 KB, 104 KB, 112 KB, and 120 KB. That is, the target array 26 is capable of providing a compression tier 162 that offers 8 KB units of allocation, another compression tier that offers 16 KB units of allocation, yet another compression tier that offers 24 KB units of allocation, and so on. Here, each supported unit of allocation is a multiple of the smallest unit of allocation, i.e., 8 KB.

It should be understood that it is not necessary that the target array 26 support every multiple of the smallest unit of allocation up to the size of a source segment 130. Along these lines, if the size of the source segments 130 is 128 KB, the target array 26 may omit compression tiers 162 for some of the larger units of allocation such as 120 KB or perhaps 112 KB and 104 KB as well since compression to these sizes does not provide as much space savings and may be more demanding in terms of workload. In some arrangements, each compression label 140 spans exactly four bits, and all of the available compression tiers 162 are capable of being identified by those four bits.

Once the specialized circuitry 100 has counted up all of the compressibility labels 140 so that the tallies 160 represent final totals, the specialized circuitry 100 outputs a compression tier arrangement 120 for application to the target array 26 (arrow 154). That is, the specialized circuitry 100 provides a customized tier arrangement that can be applied to the target array 26 prior to loading host data 32 from the source array 24 to the target array 26. In particular, the compression tier arrangement 120 which reflects the compression profile 110 may include each tally 160 and perhaps other information (e.g., an average compression ratio for all of the source segments 130 that were evaluated).

It should be understood that different applications performed by or running on the host computers 22 may influence the unit of allocation distribution represented by the compression profile 110. FIG. 4 shows a few example distributions 170 represented by the compression profile 110. Example distribution 170(A) indicates that most of the source segments 130 are compressible to the same unit of allocation, i.e., 64 KB. Example distribution 170(B) indicates that the source segments 130 are compressible fairly evenly across all of the units of allocation sizes 24 KB through 112 KB offered by the target array 26. Example distribution 170(C) indicates that the source segments 130 tend to compress to one of only a couple (or a few) of the units of allocation sizes offered by the target array 26.

Interestingly, each example distribution 170 provides an average compression ratio of 2-to-1. However, a compression tier arrangement 120 for the distribution 170(A) would advantageously include a predominant compression tier 162 that provides units of allocation of 64 KB. In contrast, a compression tier arrangement 120 for the distribution 170(B) would advantageously include a variety of compression tiers 162 that provide units of allocation of many different sizes, i.e., 24 KB, 32 KB, 40 KB, . . . , 112 KB. Further still, a compression tier arrangement 120 for the distribution 170(C) would mainly include two compression tiers 162, i.e., one compression tier 162 that provides 32 KB units of allocation and another compression tier 162 that provides 96 KB units of allocation. In some arrangements, the target array 26 offers compression tiers 162 for each supported unit of allocation size, but varies the sizes of the compression tiers 162 proportionately to match or mimic the distribution 170 represented in the compression tier arrangement 120. Of course, the distributions 170 in FIG. 4 are provided by way of example only, and actual distributions 170 may look significantly different. Once the compression tier arrangement 120 has been provided by the specialized circuitry 100, the target array 26 is preconfigured with compression tiers 162 in accordance with the compression tier arrangement 120 (arrow 156). In some arrangements, the sizes of the compression tiers 162 are proportional to the final tallies 160 in the compression profile 110. That is, prior to loading the target array 32 with data, the target array 26 is properly provisioned with data structures, tables, other metadata, etc. to support the particular compressibility of the host data 32(S) currently residing on the source array 24. In particular, each compression tier 162 is configured to store host data 32 aligned to a particular unit of allocation size (e.g., 8 KB, 16, KB, 24 KB, etc.). Each unit of allocation may then be allocated to virtual or thin devices of the target array 26 as needed (e.g., via thin provisioning).

The target array 26 may then be deployed and loaded with host data 32. Along these lines, the host data 32(S) may be transferred from the source array 24 to the target array 26 in portions, e.g., as source segments 130 of the host data 32(S). As the storage processing circuitry 40(T) of the target array 26 receives each source segment 130, the storage processing circuitry 40(T) compresses that data and then stores that compressed data in the appropriate compression tier 162 of the target array 26 (also see the storage devices 42(T) in FIG. 1).

For example, with reference back to FIG. 3, the target array 26 may compress the host data of source segment 130(1) from 128 KB to 16 KB and then store that compressed host data in the compression tier 162 that provides 16 KB units of allocation. Similarly, the target array 26 may compress the host data of each source segment 130(2), 130(3) from 128 KB to 8 KB and then store that compressed host data in the compression tier 162 that provides 8 KB units of allocation. Likewise, the target array 26 may compress the host data of source segment 130(4) from 128 KB to 64 KB and then store that compressed host data in the compression tier 162 that provides 64 KB units of allocation, and so on.

Since the target array 26 is preconfigured with compression tier capacity that proportionately matches the distribution 170 of source segments 130 of the host data 32(S), the arrangement of compression tiers 160 in the target array 26 is well sized to accommodate the compressed host data 32(T) without having to make any significant compression tier adjustments in real-time. Furthermore, the operator of the target array 26 understands that the target array 26 is properly customized regardless of any initial trends in compressing the host data 32. Further details will now be provided with reference to FIG. 5.

Figure 5:
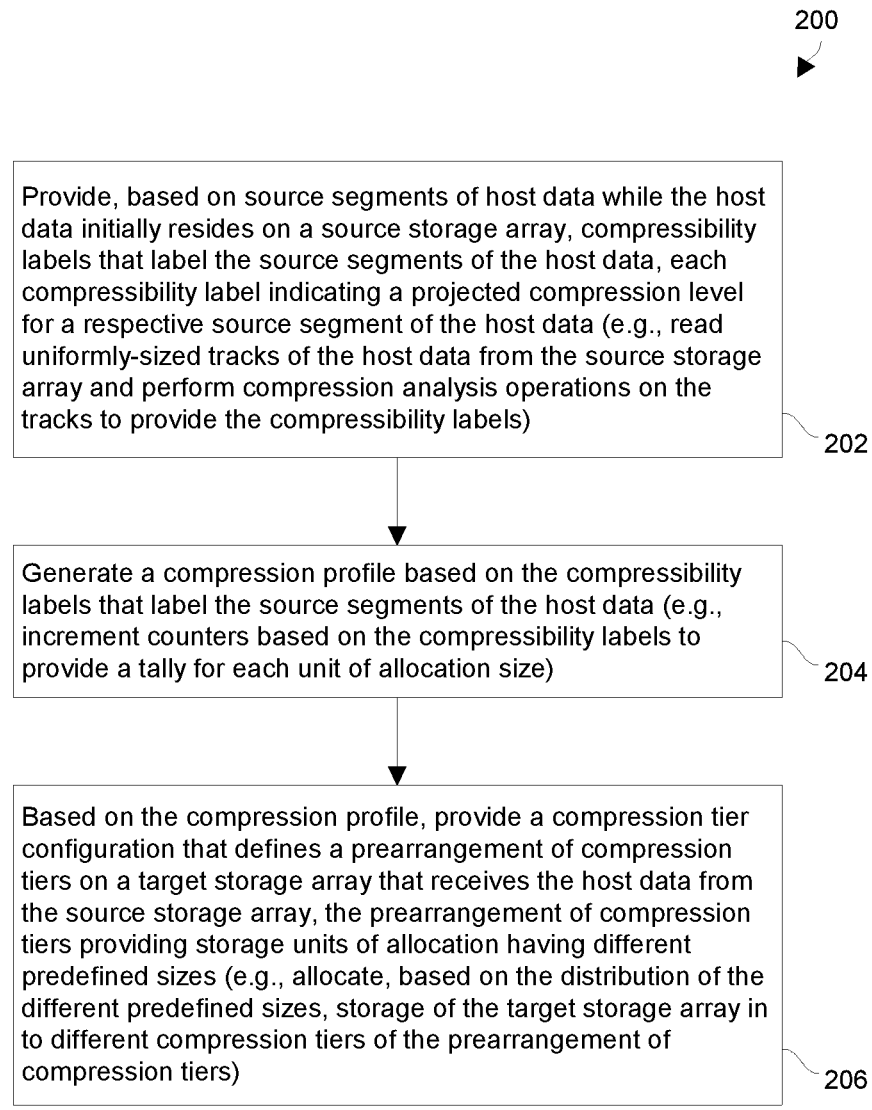
FIG. 5 is a flowchart of a procedure which is performed by the electronic apparatus of FIG. 2.

FIG. 5 is a flowchart of a procedure 200 which is performed by the specialized circuitry 100 when managing compression base on a compression profile of host data initially residing on a source storage array.

At 202, the specialized circuitry 100 provides, based on source segments of the host data while the host data initially resides on the source storage array, compressibility labels that label the source segments of the host data. Each compressibility label indicates a projected compression level for a respective source segment of the host data. That is, the specialized circuitry 100 reads uniformly-sized tracks of the host data from the source storage array (e.g., 128 KB tracks), and performs projected compression operations on the tracks to provide the compressibility labels.

At 204, the specialized circuitry 100 generates a compression profile based on the compressibility labels that label the source segments of the host data. That is, the specialized circuitry 100 increments counters based on the compressibility labels to provide tallies for each supported unit of allocation size.

At 206, the specialized circuitry 100 provides, based on the compression profile, a compression tier configuration that defines a prearrangement of compression tiers on a target storage array that receives the host data from the source storage array. The prearrangement of compression tiers provides storage units of allocation having different predefined sizes, and the capacities of the compression tiers are commensurate with the particular distribution of compressibility labels. That is, the specialized circuitry 100 allocates, based on the distribution of the different predefined sizes, storage of the target storage array into different compression tiers of the prearrangement of compression tiers.

The host data is then loaded into the target array. That is, the host data is compressed and stored within the various compression tiers.

As described above, improved techniques are directed to managing compression based on a compression profile 110 of host data 32 initially residing on a source storage array 24. Along these lines, source segments 130 of the host data 32(S) may be tagged or labeled with projected compression levels 140 while the host data 32(S) resides on the source storage array 24. A compression profile 110 which is based on the tags 140 is then used to determine a prearrangement 120 of compression tiers 160 on a target storage array 26 that later receives (i.e., compresses and stores) the host data 32 from the source storage array 26. Such operation enables the target storage array 26 to be customized with compression tiers 160 that are better suited to holding compressed host data 32(T) when the host data 32 is transferred to the target storage array 26 from the source storage array 24. Moreover, the operator of the target storage array 26 has improved awareness of how the host data 32(S) from the source storage array 24 will be compressed (e.g., an understanding that some host data is only compressible to a lower compression ratio even though the average compression ratio may be higher).

One should appreciate that the above-described techniques do not merely analyze and move around data. Rather, the disclosed techniques involve improvements to the technology of electronic data storage. In particular, with such techniques, there is less reconfiguration of compression tiers and thus less target array resources consumed in the long run. Additionally, the target array remains committed to the true compressibility distribution regardless of any initial trends that could otherwise bias how the system adapts or adjusts. Moreover, the operator of the target array 26 understands that although the initial metrics may not match the average expected compression ratio, the initial metrics are properly reflected in the pre-configuration, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as one or more of the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described techniques are suitable for use with a variety of data storage systems. An example data storage system is described in U.S. application Ser. No. 15/082,679, entitled "USE OF COMPRESSION DOMAINS THAT ARE MORE GRANULAR THAN STORAGE ALLOCATION UNITS", the contents and teachings of which are hereby incorporated by reference in their entirety. Another example data storage system is described in U.S. application Ser. No. 15/192,212, entitled "ZERO DETECTION WITHIN SUB-TRACK COMPRESSION DOMAINS", the contents and teachings of which are hereby incorporated by reference in their entirety.

Furthermore, one should appreciate that many existing data storage systems currently dynamically evolve the back-end as new data is written and evaluated. This requires constant shuffling of data as track sizes vary. However, in contrast to these existing systems and in accordance with some embodiments, specialized circuitry 100 scans the compressibility of potential customer data in such a way that it can store the amount of data that compressed into various compression tiers. Some customer data may compress, 50% at 16:1 and 50% at 1:1, which averages to 8:1 overall compression. Another system may compress, 100% at 8:1, which meets the same overall compression as the first system, but has a different compression "fingerprint". This fingerprint is provided to a storage system prior to loading the data (e.g., at the time of the sale), such that the system pre-configures it's backend to match the data that would be loaded. This pre-configuring of a system allows for optimal backend layouts, and avoids performance penalties of defragging and converting backend resources.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Furthermore, nothing precludes the target array 26 from later adjusting to changes in the compressibility of host data 32 stored thereon. For example, the operator may adjust or change the applications running on the host computers 22 which, in turn, affects how well the host data compresses. Accordingly, the target array 26 is capable of adjusting the arrangement of compression tiers 160 in real-time to accommodate such changes. Such modifications and enhancements are intended to belong to various embodiments of the disclosure.

What is claimed is:

1. A method of managing compression based on host data initially residing on a source storage array, the method comprising:
    based on source segments of the host data while the host data initially resides on the source storage array, providing compressibility labels that label the source segments of the host data, each compressibility label indicating a projected compression level for a respective source segment of the host data;
    generating a compression profile based on the compressibility labels that label the source segments of the host data; and
    based on the compression profile, providing a compression tier configuration that defines a prearrangement of compression tiers on a target storage array that receives the host data from the source storage array, the prearrangement of compression tiers providing storage units of allocation having different predefined sizes;
    wherein providing the compressibility labels that label the source segments of the host data includes:
    reading, as the source segments of the host data from the source storage array, tracks of the host data from storage of the source storage array, the tracks having a uniform size, and
    performing projected compression operations on the tracks to provide the compressibility labels; and
    wherein performing the projected compression operations on the tracks to provide the compressibility labels includes:
    for each track, performing a respective projected compression operation that uses that track as input and provides a projected compression result as output, the projected compression result including a respective compressibility label that identifies one of the different predefined sizes as a projected compression level for that track.

2. A method as in claim 1 wherein reading the tracks of the host data from the storage of the source storage array includes reading all of the host data that is stored on the source storage array.

3. A method as in claim 1 wherein reading the tracks of the host data from the storage of the source storage array includes reading, as a representative sample of the host data, less than all of the host data that is stored on the source storage array.

4. A method as in claim 1 wherein generating the compression profile includes:
    providing tallies of the different predefined sizes based on the compressibility labels that label the source segments of the host data.

5. A method as in claim 4 wherein providing the tallies of the different predefined sizes includes:
    incrementing a plurality of counters based on the compressibility labels that label the source segments of the host data, each counter of the plurality of counters representing one of the different predefined sizes.

6. A method as in claim 5 wherein providing the tallies of the different predefined sizes further includes:
    outputting, as at least a portion of the compression profile, a plurality of counter values from the plurality of counters, the plurality of counter values identifying a distribution of the different predefined sizes.

7. A method as in claim 6 wherein providing the compression tier configuration that defines the prearrangement of compression tiers on the target storage array includes:
    based on the distribution of the different predefined sizes, allocating storage of the target storage array into different compression tiers of the prearrangement of compression tiers.

8. A method as in claim 7 wherein allocating the storage of the target storage array to the different compression tiers includes:
    mimicking the distribution of the different predefined sizes in an allocated distribution of physical storage of the target storage array.

9. A method as in claim 7 wherein allocating the storage of the target storage array into the different compression tiers includes:
    creating a first compression tier from physical non-volatile memory of the target storage array, the first compression tier having storage units of allocation of a first size, and
    creating a second compression tier from the physical non-volatile memory of the target storage array, the second compression tier having storage units of allocation of a second size which is different from the first size.

10. A method as in claim 9 wherein the storage of the target storage array includes pool of storage devices; and
    wherein each storage device of the pool includes storage units of allocation of the first compression tier and storage units of allocation of the second compression tier.

11. A method as in claim 10, further comprising:
    migrating the host data initially residing on the source storage array from the source storage array to the target storage array.

12. A method as in claim 11 wherein migrating the host data includes:
    reading the source segments of the host data from the source storage array,
    processing the source segments read from the source storage array into target portions of the host data, and
    writing the target portions of the host data into the physical non-volatile memory of the target storage array.

13. A method as in claim 12 wherein writing the target portions of the host data into the physical non-volatile memory of the target storage array includes:
storing at least some target portions in storage units of allocation of the first compression tier, and
storing at least some target portions in storage units of allocation of the second compression tier.

14. A method as in claim 1 wherein each different predefined size of the different predefined sizes of the storage units of allocation is less than or equal to the uniform size;
wherein the different predefined sizes includes a smallest predefined size; and
wherein each predefined size of the different predefined sizes is a multiple of the smallest predefined size.

15. A method as in claim 14 wherein the smallest predefined size is 8 KB;
wherein each predefined size of the different predefined sizes is a multiple of 8 KB; and
wherein the uniform size of the tracks of the host data that are read from storage of the source storage array is 128 KB.

16. A method as in claim 1 wherein the target storage array includes a plurality of storage devices;
wherein the compression tier configuration defines, for the plurality of storage devices, a first compression tier having first storage units to contain data and a second compression tier having second storage units to contain data;
wherein each first storage unit has a first size; and
wherein each second storage unit has a second size that is different from the first size.

17. A method as in claim 16 wherein (i) at least a portion of a first storage unit having the first size and (ii) at least a portion of a second storage unit having the second size are deployable on a same storage device of the plurality of storage devices.

18. A method as in claim 1 wherein the target storage array includes a plurality of storage devices; and
wherein providing the compression tier configuration includes:
forming, on the plurality of storage devices, a first compression tier having first storage units to contain data and a second compression tier having second storage units to contain data;
wherein each first storage unit has a first size; and
wherein each second storage unit has a second size that is different from the first size.

19. Electronic apparatus, comprising:
memory; and
control circuitry coupled to the memory, the memory storing instructions which, when carried out by the control circuitry, cause the control circuitry to:
based on source segments of host data while the host data initially resides on a source storage array, provide compressibility labels that label the source segments of the host data, each compressibility label indicating a projected compression level for a respective source segment of the host data;
generate a compression profile based on the compressibility labels that label the source segments of the host data; and
based on the compression profile, provide a compression tier configuration that defines a prearrangement of compression tiers on a target storage array that receives the host data from the source storage array, the prearrangement of compression tiers providing storage units of allocation having different predefined sizes;
wherein the control circuitry, when providing the compressibility labels that label the source segments of the host data, is constructed and arranged to:
reading, as the source segments of the host data from the source storage array, tracks of the host data from storage of the source storage array, the tracks having a uniform size, and
performing projected compression operations on the tracks to provide the compressibility labels; and
wherein the control circuitry, when performing the projected compression operations on the tracks to provide the compressibility labels, is constructed and arranged to:
for each track, performing a respective projected compression operation that uses that track as input and provides a projected compression result as output, the projected compression result including a respective compressibility label that identifies one of the different predefined sizes as a projected compression level for that track.

20. A computer program product having at least one non-transitory computer readable medium, the at least one non-transitory computer readable medium having stored thereon a set of instructions to manage compression based on host data initially residing on a source storage array; the set of instructions, when carried out by control circuitry, causing the control circuitry to perform a method of:
based on source segments of the host data while the host data initially resides on the source storage array, providing compressibility labels that label the source segments of the host data, each compressibility label indicating a projected compression level for a respective source segment of the host data;
generating a compression profile based on the compressibility labels that label the source segments of the host data; and
based on the compression profile, providing a compression tier configuration that defines a prearrangement of compression tiers on a target storage array that receives the host data from the source storage array, the prearrangement of compression tiers providing storage units of allocation having different predefined sizes;
wherein providing the compressibility labels that label the source segments of the host data includes:
reading, as the source segments of the host data from the source storage array, tracks of the host data from storage of the source storage array, the tracks having a uniform size, and
performing projected compression operations on the tracks to provide the compressibility labels; and
wherein performing the projected compression operations on the tracks to provide the compressibility labels includes:
for each track, performing a respective projected compression operation that uses that track as input and provides a projected compression result as output, the projected compression result including a respective compressibility label that identifies one of the different predefined sizes as a projected compression level for that track.

* * * * *